United States Patent [19]

Bagnoli et al.

[11] Patent Number: 5,253,347
[45] Date of Patent: Oct. 12, 1993

[54] CENTRALIZED ARBITRATION SYSTEM USING THE STATUS OF TARGET RESOURCES TO SELECTIVELY MASK REQUESTS FROM MASTER UNITS

[75] Inventors: Carlo Bagnoli, Milan; Guido Perrella, Pescara; Tommaso Majo, Paderno Dugnano, all of Italy

[73] Assignee: Bull HN Information Systems Italia S.p.A.

[21] Appl. No.: 929,605

[22] Filed: Aug. 13, 1992

Related U.S. Application Data

[62] Division of Ser. No. 424,378, Oct. 20, 1989, Pat. No. 5,182,808.

[30] Foreign Application Priority Data

Nov. 18, 1988 [IT]  Italy ............................. 22651 A/88

[51] Int. Cl.$^5$ ................. G06F 13/14; G06F 13/36; G06F 13/362
[52] U.S. Cl. ................................ 395/325; 395/425; 395/725; 364/DIG. 1; 364/240.1; 364/242.6
[58] Field of Search ................ 364/DIG. 1, DIG. 2; 395/200, 325, 725, 800

[56] References Cited

U.S. PATENT DOCUMENTS

| | | | |
|---|---|---|---|
| 4,191,997 | 3/1980 | Luiz ........................... | 395/725 |
| 4,219,873 | 8/1980 | Kober et al. ............... | 395/650 |
| 4,633,392 | 12/1986 | Vincent et al. ........... | 395/325 |
| 4,888,684 | 12/1989 | Lilja et al. .................. | 395/550 |
| 5,081,576 | 1/1992 | Ward .......................... | 395/325 |

*Primary Examiner*—Thomas C. Lee
*Assistant Examiner*—John C. Loomis
*Attorney, Agent, or Firm*—J. S. Solakian; J. H. Phillips

[57] ABSTRACT

In order to arbitrate competing requests made by master elements for shared resources in a data processing system in which the masters have controlled access to the resources through a communication bus, there is provided an arbitration unit coupled to the masters and to the resources through the communication bus. There is further provided logic structure in each master for generating and sending access request signals to the arbitration unit indicating that the master needs to direct, through the communication bus, a specified resource to perform an operation, the selected resource being identified by at last one of the access request signals. The arbitration unit, upon receiving the access request signal, arbitrates among competing access request signals, which may be concurrently received from a plurality of masters, according to predetermined priority criteria. The arbitration unit includes a masking scheme responsive to at least one of the following occurrences: a) the arbitration unit having already granted access to one of the masters, through the communication bus, for directing an indicated resource to perform an operation; and b) a signal generated by at least one of the resources and received through the communication bus indicating that the resource is ready or not ready to perform an operation. The arbitration unit generates an access grant signal granting access to one master at a time based on arbitration performed among unmasked competing access request signals received through the communication bus.

4 Claims, 3 Drawing Sheets

CENTRALIZED ARBITRATION SYSTEM USING THE STATUS OF TARGET RESOURCES TO SELECTIVELY MASK REQUESTS FROM MASTER UNITS

This is a divisional of copending application Ser. No. 07/424,378 filed on Oct. 20, 1989, now U.S. Pat. No. 5,182,808.

The present invention relates to a multiprocessor system having distributed shared resources.

In the system, each processor is provided with at least a local working memory to which the other system processors too, have access through a system bus.

The system bus itself consitutes a shared common resource.

For such systems several architectures have been proposed and implemented.

The main problems to be solved in such architectures are conflict resolution in giving access to the common or shared resources, deadlock prevention and optimal expoitation of the available resources.

A data processing system having distributed shared resources comprises, in its simplest architecture, a plurality of processors, each communicating with its own local memory through a local bus and a system bus, connected to the several local busses, through interface and arbitration circuits.

A processor, in order to have access to the local memory of another processor must get access to its local bus, to the system bus and to the local bus of the other processor as well.

Therefore, from a logical standpoint, three arbitration levels are involved: a first level for obtaining control of the local bus related to the agent processor, a second level for obtaining control of the system bus, and a third level for obtaining control of the local bus related to the local memory acting as a replier.

The agent processor may get access to the local memory of another processor only when an arbitration phase has been completed by which all the required resources are made available to the agent processor.

If the arbitration process is performed, as it occurs in practice, by steps which follow each other both logically and in time sequence, in the sense that the agent processor first gets access to its own local bus, then access to the system bus, and finally gets access to the local bus related to the replier local memory, unresolved conficts may arise and result in a deadlock situation.

Let us assume that a processor A obtains access to its local bus BLA and requests access to the system bus SB for reading/writing into the local memory LMB related to a processor B. Meanwhile processor B obtains access to its local bus BLB and requests access to system bus SB to read or write into the local memory LMA related to processor A.

Even if the arbitration process grants to processor A access right to the system bus, processor A cannot communicate with local memory LMB because the local bus BLB is already busy. Therefore it must wait untill the local bus BLB becomes free.

This is impossible, because processor B, in order to release the local bus BLB needs to get access to the system bus which is kept under control of processor A.

The same stalemate situation occurs if processor B obtains access to the system bus, instead of processor A.

Several arrangements have been proposed for the resolution of these conflicts.

They range from "time out" and "retry" mechanism to circuits for deadlock detection and disconnection of the agents causing the deadlock.

These arrangements have severe drawbacks in terms of performance degradation and/or complexity of the communication paths among the several system units as well as of the arbitration and control circuits, with the consequence of increased costs.

These disadvantages are overcome by the multiprocessor system having shared distributed resources and deadlock prevention which is the object of the present invention and which further provides the advantage of being implemented with system bus control and arbitration units available on the market int he form of integrated circuits.

It further offers the advantage of a global increase in performance.

These advantages are achieved by designating master elements in the system for accessing the shared resources through a communication bus in accordance with the actions of an arbitration unit coupled to the masters and to the resources through the communication bus. Logic structure in each master generates and sends access request signals to the arbitration unit indicating that the master needs to direct, through the communication bus, a specified resource to perform an operation. The arbitration unit, upon receiving the access request signal, arbitrates among competing access request signals, which may be concurrently received from a plurality of masters, according to predetermined priority criteria. The arbitration unit includes a masking scheme responsive to at least one of the following occurrences: a) the arbitration unit having already granted access to one of the masters, through the communication bus, for directing an indicated resource to perform an operation; and b) a signal generated by at least one of the resources and received through the communication bus indicating that the resource is ready or not ready to perform an operation. Thus, the arbitration unit generates an access grant signal granting access to one master at a time based on arbitration performed among unmasked competing access request signals received through the communication bus.

In this way, each processor, having started an access request to resources which may be reached through the system bus, and having loaded the interface buffer, may release its own local bus and the bypass circuitry enables getting access from the system bus to the local bus, if it is free, without affecting the interface buffer.

To this purpose, in particular for read operation, an isolation block is provided for isolation of the processor outputs from the local bus, so as to enable the execution of a read operation with a first occupation phase of the local bus (or selection or posting phase) and a second occupation phase of the local bus or reconnect for effectively receiving the read out information.

The features and the advantages of the present invention will appear more clearly from the following description and from the enclosed drawings where.

DETAILED DESCRIPTION

Figure 1:
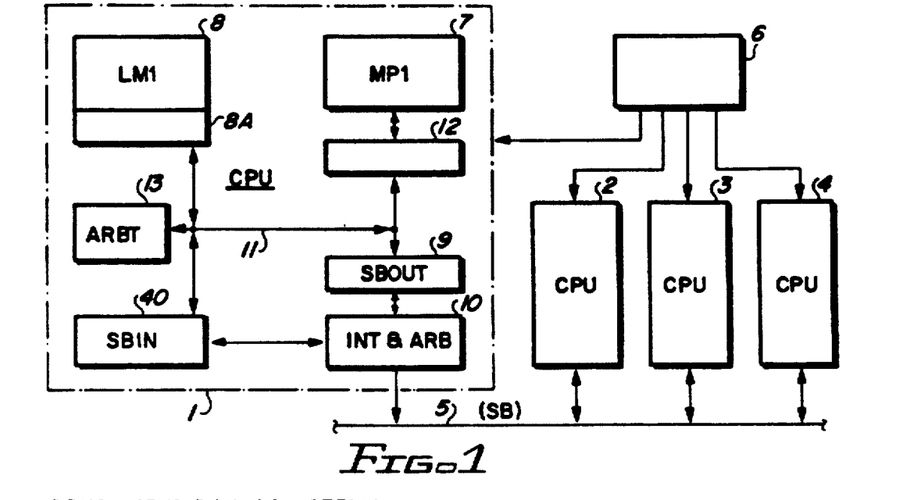
FIG. 1 is a block diagram of a multiprocessor system in accordance with the present invention.

FIG. 1 shows in block diagram a multiprocessor system in accordance with the present invention.

The system comprises a plurality (for instance four) of central processing units or CPU 1,...4.

The units are identical to each other in the architectural details which are shown with reference to CPU 1 only.

The several CPUs communicate with each other through a system bus (SB) 5.

In addition to the several CPUs, shared memories and input/output controllers, not shown, may be connected to the system bus 5.

A timing unit 6 provides timing signals required for operation of the system.

CPU1 comprises a processing unit 7 or microprocessor MP1, a local memory 8 (LM1) and an interface and arbitration unit 10 (INT & ARB) of the system bus.

Units 7,8,10 communicate with each other through a local bus 11.

More precisely, MP1 7 communicates with the local bus 11 through a control and isolation block 12 and the interface unit 10 communicates with the local bus 11 through a buffer output unit 9 or SBOUT and through an input block 40 or SBIN.

Access to local bus 11 from the several units is controlled by a control and arbitration block 13 or ARBT.

The interface unit 10 enables connecting system bus 5 to local bus 11, through block 40 when the request for access to local bus comes from the system bus, through block 9 when the requests for access to system bus comes from the local bus.

Interface unit 10 arbitrates control over the system bus together with the corresponding interface units of the other CPUs.

The units connected to the local bus are of two kinds: "masters", which can request and obtain access to the local bus, and "slaves" which are selected or referenced on master request.

Typically unit MP1 and the system bus as seen through unit 10 and block 40 are "master" units.

Local memory 8, and system bus, as seen through blocks 9 and 10 are "slave" units.

However, for the purpose of getting access to local bus, memory 8 and system bus may take the "master" role for performing the reply phase or reconnect operation required by read operations.

With the above summarized architecture any deadlock problem is avoided.

In fact, if MP1 obtains access to the local bus (by arbitration unit 13) block 12 is enabled and MP1 may perform an information transfer by selecting either local memory 8 or block 9.

In the second alternative block 9 acts as a buffer for transfer requests which select some resource external to CPU1, for instance local memory LM4 of CPU4, through system bus 5.

In this case, block 9 transfers to unit 10 a system bus access request.

If the access request is for a write operation through the system bus, the address to be written to, the datum to be written and the related write command are loaded in buffer 9.

In this way processor MP1 and block 12 may release the local bus.

It is a task of block 9 to start the interface unit 10 which provides for obtaining, through a suitable arbitration protocol, the system bus so as to execute the write operation so posted.

If the access request is for a read operation through system bus, the address where to read and the related read command are loaded in buffer 9.

Block 12 may release the local bus while processor 7 waits for the requested data.

It is a task of block 9 to start interface unit 10 which provides for obtaining, with the required arbitration, the system bus to perform the read operation already posted.

In both cases, if the interface unit 10 has already been selected, through signals present on the system bus, as a receiving unit, to write a datum present on system bus in local memory 8 of CPU1, or to read in the same local memory a datum to be transferred on the system bus, unit 10 temporarily neglects the request pending in buffer 9 and may start block SBIN 40.

The information related to the access cycle requested by system bus SB is stored in block 40.

Block 40, in turn, may request and obtain access to local bus 11 from arbiter 13 and therefore it may complete the access to local memory 8.

Once the information has been stored or the read request has been posted, the local bus 11 is released.

In case of write operation the system bus 5 is released too, whilst in case of read request it is released only once the requested information has been read out and transferred on SB5.

The release is performed by the interface unit of the CPU acting as "agent".

Once SB5 has been released, interface unit 10 may request access to system bus 5 with an arbitration protocol.

When access is granted, it may perform the transfer on the bus of the read/write message pending in buffer 9.

Once the operation has been performed, if a write, the system bus SB5 is released In case of a read, the read out data is transferred through SB5 and interface unit 10 to block 9 which requests access to local bus.

Arbitrator 13, taking in account the established priorities and for a predetermined time interval, sends an access granting signal to block 9.

The same signal, received by block 12, which has stored therein a condition of wait for data received from system bus, enables block 12 to detect that the data is available.

Block 12 signals the event to processor 7 which can receive the data.

The communication process is therefore concluded without deadlock.

It may be noted that, whilst for read operations performed by a CPU in the local memory of another CPU, a process is used which consists in the "posting" of the read command, followed by a reconnect phase for receiving the read data, in case of a write operation the used process consists in the "posting" phase only. However it would be possible to use the posting and reconnect process even in case of a write, to give the agent processor a means for receiving error signals (data transfer error, unexisting or protected memory location selection) in the course of the same write operation.

It is clear that during the time in which processor MP1 is disconnected from local bus and the transfer process on the system bus is still active or pending in block 9, the local bus may be used for other purposes, not only for deadlock prevention For instance, once a write has been posted, processor MP1 may proceed by performing other operations which require the use of the local bus such as access to local memory or to local resources, not shown, without need to wait for conclusion of the operation on the system bus.

If the posted operation is a read, MP1, waiting for the data, cannot have access to the local bus for other purposes, but other "masters" not shown, for instance a direct memory access unit DMA, can have access to local bus for references to local "slave" unit other than block 9 (in case block 9 too may be referenced for a write posting).

It is therefore clear that the overall operative speed of the system may be increased because the use of the local bus is no longer constrained by operations running on the system bus.

It is further clear that even if not required for resolution of deadlock but of advantage for a more efficient use of the local bus, the local memory may be provided with a buffer similar to block 12, so that read operations requested to local memory can be performed with a process of selection (or posting) and reconnection.

For this reason, in local memory 8 of FIG. 1 an interface block 8A is shown which is intended to have this function.

Generalization of the communication concept between master and slave, based on the posting and reconnect process, makes possible the execution of the two phases in very short time intervals of local bus occupation, if the buffers of the destination resources are available.

A further advantage in the efficient use of the local bus is therefore achieved by providing a local bus arbitrator which grants access to a requestor not only by resolving conflicts among competing masters in compliance with predetermined priorities, but also in dependance on the availability of the destination units to perform the particular type of requested operation.

In a preferred embodiment of the system of FIG. 1 the several processors, such as MP1 may consist in the integrated circuit 68030 of the US firm MOTOROLA. The "user manual" of such product, published in 1987, provides all the information required for the use and operational understanding of the component.

The interface unit 10 is preferably an integrated circuit component MPC "message passing coprocessor" manufactured by the firm INTEL and described in the manual "MPC user manual" published in 1986.

This component enables handling the communication protocol and arbitrating access requests to a system bus known as MULTIBUS II defined by the international standard "High Performance Synchronous 32 bit BUS Standard" published by IEEE on 29.05.1987.

This document is referenced for detailed information relating to the communication protocol and features of such bus.

Figure 2:
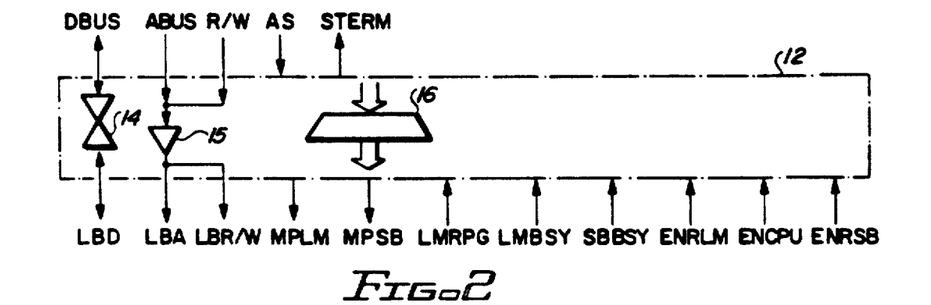
FIG. 2 is a block diagram of an interface block between processor and local bus for the system of FIG. 1.

FIG. 2 shows in block diagram a preferred embodiment of interface block 12, which, in the previously described contexts is particularly simple, and essentially consists of a set of transmitter/receivers or "tranceivers" 14, a set of tristate gates 15 and a combinatorial network or decoder 16.

On the upper side of block 12 there are shown the leads/signals which interface with MP1.

On the lower side of block 12 the signals/leads used by the local bus are shown.

The bidirectional data path DBUS of MP1 is connected to a data channel LBD of local bus through the set of "transceivers" 14.

The address channel ABUS of MP1 is connected to an address channel LBA of local bus 11 through the set of gates 15.

Block 12 receives further from MP1 a signal AS which, when asserted, validates addresses, data and commands issued by MP1, and a signal R/W which defines, with its logical level, the nature of the operation requested by MP1, as a write (R/W deasserted) or read (R/W asserted).

Block 12 sends to MP1 a signal STERM having a predetermined phase relationship as to a clock signal CK used for timing the MP1 operation.

When asserted STERM indicates that the operation requested by MP1 may be completed. m In case of a read it further indicates that the requested data are or will be available within the next occurrence of the CK clock.

Block 12 receives, from the arbitration unit 13 and through the local bus, a signal ENCPU which enables it to have access to the local bus.

It further receives two signals ENRLM and ENRSB respectively indicating that local memory or system bus are enabled to reconnect themselves to the local bus for providing a read out data to the requesting "master" unit.

Through the local bus, three other signals are received by block 12: LMBSY, LMRPG (issued by block 8A) and SBBSY (issued by block 9)

When asserted, signals LMBSY and SBBSY indicate that the related blocks are busy and cannot accept any new request.

Signal LMRPG asserted indicates that although block 8A has started a read operation (that is, it has transferred commands and addresses), the read operation is still pending.

The following signals are put by block 12 on local bus 11 for distribution to the several units 8A,13,9:

LBR/W (equivalent for R/W) which defines the requested operation as a read or a write LBR/W is controlled by one of the gates in set 15.

MPLM which selects the local memory as a "slave" or destination unit.

MPSB which selects the system bus (through block 9) as a slave referenced by the command.

Decoding network 16 combines the several signals in input to block 12 to generate the output signals and internal signals for controlling the gates 14 and 15.

The timing of the produced signals depends on the timing of the signals received from outside.

More than any detailed circuit description, the operation and the implementation of block 12 is better described by the following logical equations, where the letter $\overline{N}$ preceding the name of the signals indicates, here and in the following, the symbol of logical inversion or negation.

MPLM=An.AS.ENCPU.NLMBSY.NR/W+An-
.AS.ENCPU.R/W. NLMRPG.NLMBSY

This equation substantially indicates that signal MPLM, which from local bus controls the selection of the local memory, is asserted if one or more bits An of an address reference the local memory as a destination unit for the command, if such bit An is validated by AS, if processor MP is enabled to get access to the local bus by arbitrator 13 (ENCPU asserted) and if the local memory is not already busy (LMBSY deasserted in case of write and LMRPG deasserted in case of read).

The distinct treatment of the read and write commands is explained considering that a write command from MP1 may be "posted" in the local memory interface 8A even if the local memory is running a read operation previously requested by another master.

Once the write command has been posted, the processor MP is free to proceed with the execution of other operation.

On the contrary, in case of a read command, the processor MP must wait for the read out data. Therefore it is preferable to postpone the read command until it can be effectively executed.

Moreover, overlapping of local memory read commands issued by different requesting units is prevented, which would make difficult the identification of the units to which the data is directed when it becomes available.

MPLM is deasserted when the command is accepted by the local memory interface unit 8A.

At that time unit 8A is set busy and LMBSY becomes asserted.

MPLM enables the tranceivers 14 and the gates 15 towards the local bus.

In a similar manner, but without distinction between read and write operations, the command which selects block 9 for accessing the system bus and for enabling tranceivers 12 and gates 15 towards the local bus is expressed by the following equation:

$$MPSB = Am.AS.ENCPU.\overline{NSBBSY}$$

where Am is one or more bits of an address which references the system bus as a destination space (external space) for the command.

Signal STERM in case of a write operation is expressed by the following equation:

$$STERM = MPLM.\overline{NR/W} + MSPB.\overline{NR/W}$$

or preferably and only for reason of operative speed by:

$$STERM = An.ENCPU.\overline{NLMBSY}.\overline{NR/W} + Am.ENCPU.\overline{NSBBSY}.\overline{NR/W}$$

In case of a read operation:

$$STERM = R/W.An.AS.\overline{ENRLM.POST} + R/W.Am.AS.ENRSB.POST$$

where POST is a signal internal to block 12.

POST is generated according to the following equation:

$$POST = MPLM.R/W + MPSB.R/W + POST.\overline{NAS}$$

In other words, based on the address output by MP, the block 12, once having sent the read command (POST asserted), detects if the reconnection performed by arbiter 13 is intended for itself or for another destination unit.

The transceivers 14 may be enabled to receive data from local bus and towards MP by command R/W asserted.

Figure 3:
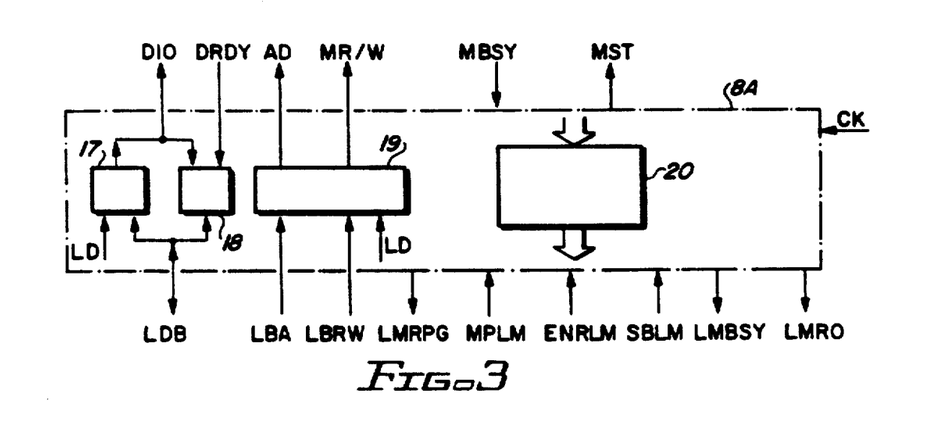
FIG. 3 is a block diagram of an interface block between local bus and local memory in the system of FIG. 1.

FIG. 3 shows in block diagram the interface block 8A of local memory.

Block 8A comprises a memory input data register 17, a memory output data register 18, having tristate outputs, an address and command register 19 and a finite states logic 20.

The signals exchanged with the local bus are shown on the lower side of block 8A.

They are LBD (data), LBA (addresses), LBR/W (read/write command), MPLM (selection command generated by processor MP1), SBLM (selection command generated by block 40 for access to local memory from system bus, LMBSY (output signal to indicate that block 8A is already busy), LMRPG (output signal indicating that a read operation is pending), LMRQ (output signal indicating that local memory requires a reconnection to local bus) and ENRLM (command which enable reconnection of local memory and which is generated by arbitration unit 13).

The signals exchanged between block 8A and local memory are shown on the upper side of block 8A.

They typically are: DI/O (input/output data) AD (addresses), MR/W (read/write command) DRDY (data ready signal), MST (memory start signal), MBSY (memory cycle running and memory busy signal).

Block 8A receives further a periodic timing signal CK from unit 6 (FIG. 1). The loading of registers 17,19 is performed by the following command:

$$LD = CK.MPLM + CK.SBLM$$

MPLM and SBLM are asserted if block 8A is ready to receive commands, that is if LMBSY is deasserted, and if the related master has received access to local bus.

Register 18 is loaded, owing to command DRDY, with the data read out from memory.

The outputs of register 18 are enabled by ENRLM.

Signal LMBSY is given by the following equation:

$$LMBSY = MPLM.CK + SBLM.CK + LMBSY.\overline{N(MST.CK)}$$

In other words LMBSY is asserted when the read/write command is loaded and is self sustaining until the joint presence of CK and MST removes self sustainance.

The memory start signal MST is given by:

$$MST = LMBSY.\overline{NMBSY}$$

It is asserted (if an operation has been posted in block 8A and therefore LMBSY is asserted) as soon as the memory becomes busy.

Signal LMRPG is given by the following equation:

$$LMRPG = MPLM.CK.\overline{LBR/W} + SBLM.CK.\overline{LBR/W} + LMRPG.\overline{NENRLM}$$

In other words it is asserted when a read command is sent to block 9 and is self sustaining until block 9 is enabled to reconnect to local bus by signal ENRLM asserted.

LMRQ is given by the following self-explantory equation:

$$LMRQ = DRDY + LMRQ.\overline{N}ENRLM$$

Figure 4:
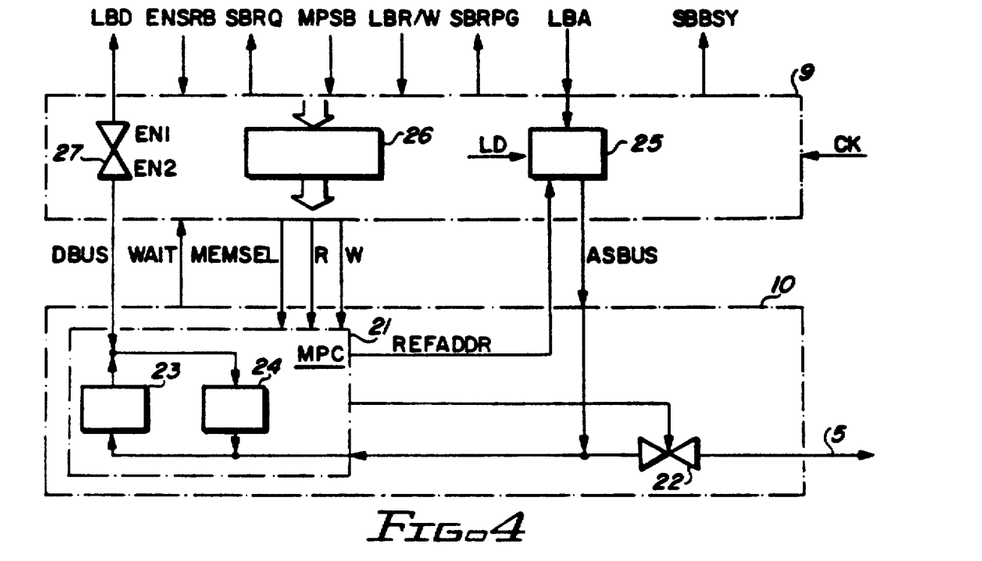
FIG. 4 is a block diagram of an interface block for accessing the system bus from local bus in the system of FIG. 1.

FIG. 4 shows in schematics the interface and arbitration unit 10, block 9 and the interconnections of the two units between each other and with the local bus on one side and the system bus on the other.

Block 9 exchanges with local bus 11 data LBD, receives addresses LBA and signal LBR/W.

It further receives selection command MPSB from block 12, reconnection signal ENRSB from arbitrator 13 and forwards signals SBRQ (to arbitrator 13 for reconnection to local bus) and SBBSY (both to arbitrator 13 and to block 12).

It further receives timing signal CK from unit 6 (FIG. 1).

Block 9 exchanges with unit 10 the following signals: data (DSBUS), addresses (ASBUS) a signal MEMSEL (which characterizes the operation to be performed), and two distinct commands for starting a read operation (R) or write operation (W).

Block 9 receives from unit 10 a signal WAIT (indicating that the requested operation is running) and a signal REFADDR which enables an address register to transfer the address stored therein to the system bus.

WAIT signal is deasserted immediately before data availability on the system bus.

The above mentioned signals are the only one required in the case, considered here, that unit 10 consists in coprocessor MPC of the INTEL firm.

Unit 10 comprises, in addition to coprocessor MPC 21 a set of control gates 22 which connect the coprocessor to the system bus. They are controlled by the coprocessor.

Coprocessor 21 comprises two registers 23,24 for latching the data (DS BUS) exchanged with block 9 and, once triggered by assertion of MEMSEL signal, manages in an autonomous way the arbitration of the system bus and its communication protocol.

Block 9 essentially comprises a set of tranceivers 27 for isolation of local data bus LBD from system data bus DSBUS, a register 25 for latching an address and a finite state logic 26 for generating control signals as a function of the signals received as input.

The control signals satisfy the following equations:

MEMSEL = MPSB $W = \overline{N}LBR/W.MPSB.CK + W.SBBSY$ $R = LBR/W.MPSB.CK + R.SBBSY$ $SBBSY = MPSB.CK + SBBSY.\overline{N}REFADDR + SBBSY.WAIT$ $SBRPG = R.REFADDR + SBRPG.\overline{N}ENRSB$ $SBRQ = SBRPG.\overline{N}WAIT$ These equations are imposed by the timing requirements of the MPC coprocessor.

MEMSEL must be asserted before the R or W command.

R or W command must remain asserted at least until deassertion of WAIT signal. The last is asserted with a certain delay as to when MEMSEL is received by the coprocessor.

Therefore two self-sustenance terms for SBBSY are required.

SBRPG is an internal auxiliary signal used for generation of SBRQ.

Gates 27 are enabled for transfer towards MPC21 by a signal EN1 = MPSB and for transfer towards local bus by signal EN2 = ENRSB.

Register 25 is loaded by a command LD = MPSB.CK and its outputs are enabled by signal REFADDR which is generated by MPC21 with a timing required by the interface protocol of the system bus.

Figure 5:
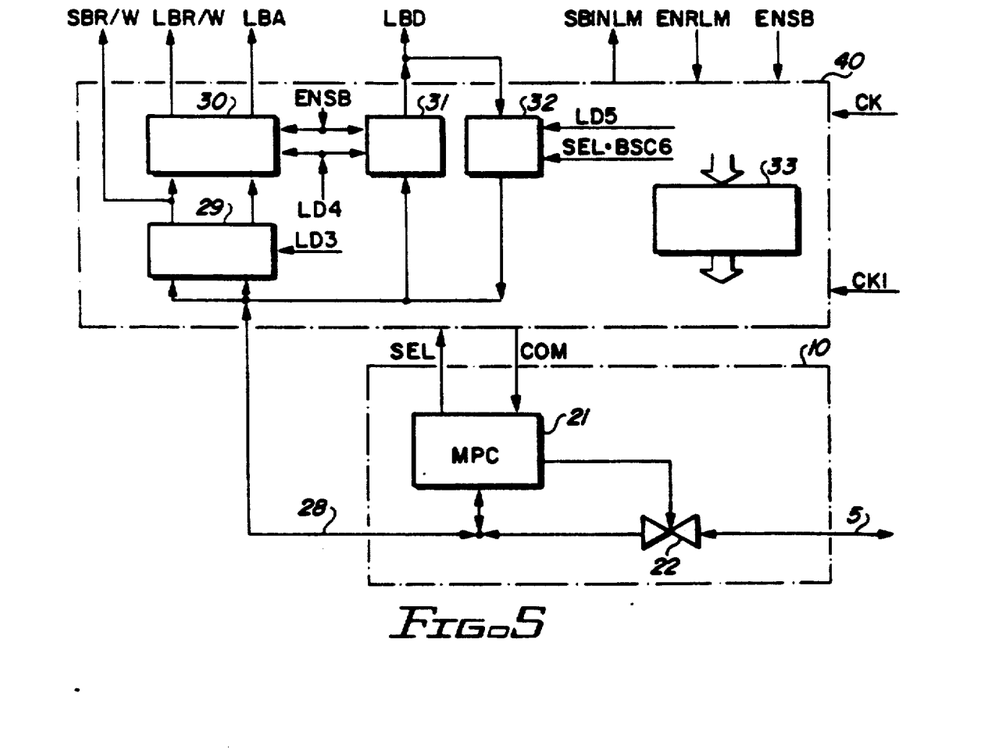
FIG. 5 is a block diagram of a bypass block for acessing the local bus from system bus in the system of FIG. 1.

FIG. 5 shows in block diagram the interface unit 10, the block 40 (SBIN) and the interconnections of the two units each to the other and with the local bus on one side and the system bus on the other.

As already said the interface unit 10 comprises the coprocessor 21 and the set of transceivers 22.

Through these transceivers, the system bus, or more precisely the leads of the system bus intended for transferring data, addresses, and commands, are connected to both block 10 and block 40. They provide a path 28 for bypassing interface unit 10.

Block 40 essentially comprises a buffer register 29 for storing addresses and commands received from bypass 28, and address and command register 30, cascaded to the first one, a data register 31 for data which from bypass 28 must be directed to the local bus, a data register 32 for data with from the local bus must be directed to the bypass 28 and a finite state logic 33 for generation of control signals as a function of the signals received from local bus and unit 10.

It is known that coprocessor 21 continuously monitors the signals present on the system bus and is able to distinguish among the several phases of arbitration, command, and data transfer occurring on the system bus.

It is further capable of detecting address fields which make reference to it as interface of a destination space.

When this happens, coprocessor MPC asserts a selection signal SEL towards block 40.

SEL remains asserted until the "handshaking" procedure on the system bus is completed, that is until certain signals on the system bus, which are referenced in the MULTIBUS specification as BSC2,BSC2,BSC4, are asserted.

Coprocessor 21 receives a signal COM from block 40.

COM indicates that block 40 is ready to complete the requested operation.

The following information is exchanged between block 40 and local bus:

-Data LBI in output from register 31 or input to register 32,

Addresses in output from register 30 towards local bus,

Control signals LBR/W, SBINLM, SBR/W towards local bus and control signals ENSB, ENRLM from local bus.

Block 40 further receives a periodic timing signal CK1 (in addition to CK) from unit 6. CK1 is a timing signal which is used for timing the operation of the system bus.

Register 29 may be considered as a "freezing" register for keeping track of a transient status which occurs on the system bus, that is the command phase.

During the command phase, characterized by the assertion of a signal BSCO on the system bus, addresses and commands are present on the system bus.

The load command for register 29 is therefore LD3 = BSCO.CK1 and the information latched in register 29 is held until a new assertion of BSCO.

Registers 30,31 are loaded by a control signal LD4 given by the following equation.

$$LD4 = SEL.\overline{NBSY}.\overline{NSEL1}$$

In other words if coprocessor 21 recognizes an address present on the system bus as an owned destination space, it asserts SEL.

This occurs when the address is no longer present on the system bus, the information to be written being instead present in case of a write operation.

Therefore on assertion of SEL register 30 is loaded with the address and commands already stored in register 29 and register 31 is loaded with the data which may be present on the system bus.

The load operation is performed only if the two internal signals BSY and SEL1 are deasserted.

BSY indicates that register 30 and 31 are busy and is defined by the equation:

$$BSY = LD4 + BSY.\overline{ENSB}.CK$$

BSY is asserted with LD4 and is self sustained until command ENSB connection command to local bus, synchronized with the local bus clock, is received by unit 40.

SEL1 is an auxiliary signal defined by the following equation:

$$SEL1 = ENSB + SEL1.\overline{N(NSEL.CK1)}$$

SEL 1 is asserted when the command ENSB for connection of block 40 to local bus is received.

SEL1 self sustains until the occurrence of the first clock CK1 of system bus, next following deassertion of SEL signal.

In the equation which defines LD4, the term NSEL1 guarantees that after the first loading of registers 30,31 their state is not changed until signal SEL is effectively deasserted, even if signal BSY is deasserted.

Signal SBINLM by which block 40 requests access to local bus is defined by equation:

$$SBINLM = BSY$$

Signal SBR/W is given by SBR/W = BSC6, where BSC6 is a control signal appearing on system bus in the command phase and latched in register 29.

When asserted, BSC6 identifies the requested operation as a write.

Signal SBR/W is used in block 40 to "remember" when the requested operation is for a read and therefore data read out from local memory have to be received in the reconnect phase.

SBR/W is further sent to arbitrator 13, which prevents block 40 from having access to local memory if a read operation is pending.

Signal COM is defined by the following equation:

$$COM = SBINLM.\overline{NSBR/W} + ENRLM.SBR/W.SEL1 + COM.\overline{SEL1}$$

It is asserted with the access request to local bus in case of a write and with the command for reconnection of local memory (detected as of pertinence if SEL1 is asserted) in case of a read.

COM is self sustaining until SEL1 is deasserted.

In case of a write operation COM signals to coprocessor MPC that the interface protocol may be concluded.

In case of a read operation COM signals that the read out data is available.

Coprocessor MPC controls gates 22 for the transfer of the read out data, from register 32 (where it has been loaded by a command LD5 = ENRLM.SBR/W.CK) to the system bus, through the bypass 28.

It further provides to complete the interface protocol on the system bus.

The outputs of register 32 are enabled by a control signal SEL.BSC6.

The outputs of registers 30,31 are enabled by signal ENSB.

Figure 6:
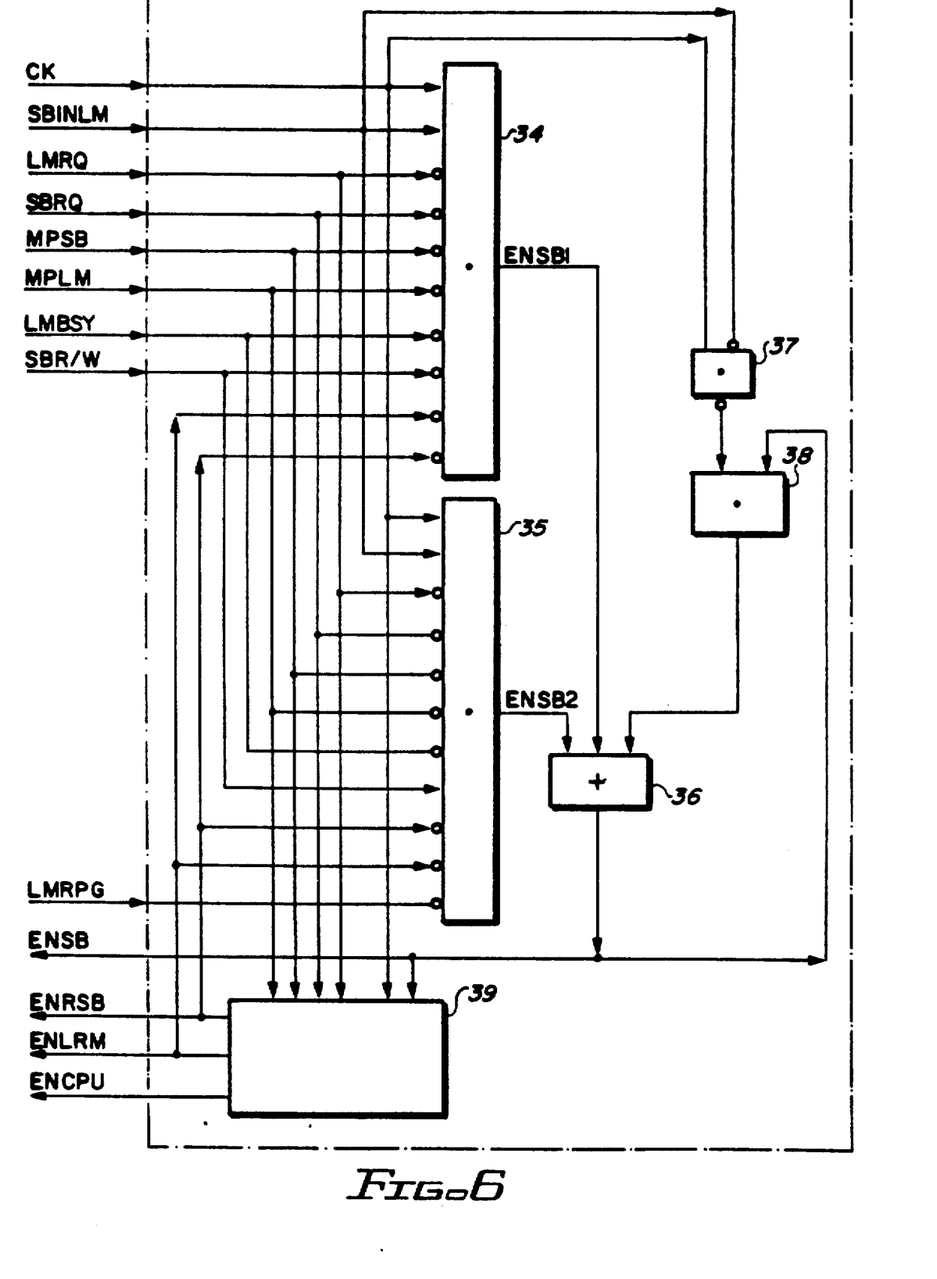
FIG. 6 is a block diagram of an arbitration unit for arbitrating access to local bus in the system of FIG. 1.

FIG. 6 shows the signals in input to and output from arbitration unit 13.

Arbitration unit 13 may be implemented in several ways: a preferred embodiment with PLA (Programmable Logic Array) is for instance described in the EP-A-0274648.

The operation and implementation of arbitrator 13 is better described by its logical equations than by its electronic schematics.

Basically arbitrator 13 receives local bus access requests from the several units, samples the several requests concurrently present at the occurrence of a clock signal CK and depending on the priority assigned to each requesting unit, it generates a signal which grants access to the higher priority unit.

A preferred priority order in servicing access requests is, for example, (in decreasing order of priority):

Local Memory request for reconnection (in order to provide the read out data)
Block 9 (system bus) for reconnection
Block 40 for access to local memory from system bus
Block 12 (that is MP1) for access to local memory or system bus.

MP1 having the lowest priority, access to local bus is granted to MP1 "by default", that is absent any request of higher priority and if the local bus is available signal ENCPU is always generated.

To prevent arbitrator 13 from removing the local bus access right granted to MP1 when MP1 is performing some operation on the local bus, block 12 signals, by means of MPLM,MPSB, that an operation is currently in execution.

An original feature of arbitrator 13 is that the units requesting access to the local bus identify the type of requested resource and the operation to be performed.

Thus for instance, system bus interface block 40 indicates that the requested resource is the local memory (SBINLM). In addition it indicates whether the operation is a read one or a write one (SBR/W).

The arbitrator 13 grants access to local bus not only as a function of the assigned priorities, but also as a function of the requested resource status.

In other words, if the destination resource is busy and cannot perform the particular kind of requested operation, the access request is masked and a lower priority request, which however designates an available resource, is enabled to prevail.

Because of the mechanism of "posted write" and read operation performed with command posting and subsequent reconnect, if the destination resource is available, each phase of local bus allocation to a requesting unit requires to only cycles of the timing signal (the cycle which precedes the clock signal CK by which the operation is posted in a destination register and the immediately following cycle).

Therefore the local bus is efficiently used.

Several access operations to available resources may be performed in the time required to a resource for becoming available and the local bus is not kept busy by a higher priority unit waiting for the availability of a destination unit.

The same rule is followed by block 12 as beneficiary of local bus access by default.

Even if local bus is available (ENCPU asserted) block 12 before asserting MPSB or MPLM checks that the destination unit is available (SBBSY or LMBSY deasserted).

In case of a read request to local memory, it further checks that a read operation is not already running (LMRPG deasserted).

Having pointed out the previous concepts the following logical equations which describe the operation of arbitration unit 13 are self explanatory:

ENRLM=LMRQ.CK.NMPSB.NMPLM-
.NENRSB.NENSB+ENRLM.N(NLMRQ.CK)

ENRSB=SBRQ.CK.NMLMRQ.NMPLM.NMPS-
B.NENRLM.NENSB+ENRSB.N(NSBRQ.CK)

ENSB=S-
BINLM.CK.NLMRQ.NSBRQ.NMPSB.NMPL-
M.NENRSB.NENRLM.NLMBSY.NSBR/-
W+ENSB.N(NSBINLM.CK) (in case of write)

ENSB=S-
BINLM.CK.NLMRQ.NSBRQ.NMPSB.NMPL-
M.NENRSB.NENRLM.NLMRPG.SBR/W.
NLMBSY+ENSB.N(NSBINLM.CK) (in case of read)

ENCPU=NENRLM.NENRSB.NSBLM

As already stated the several logic functions described by the previous equations may be performed by logic networks implemented with components available on the market, such as AND,OR,INVERTERS, or preferably by means of programmable array logic (PAL) or gate array logic.

By way of example in FIG. 6 there is shown a logic network for generation of signal ENSB.

Two AND gates 34,35 having inverting and non-inverting inputs receive the several signals which describe the status of the local bus and the status of the several units connected thereto.

The AND gates 34,35 output signals ENSB1, ENSB2 respectively in case of write or read operation.

The output of gates 34,35 are connected to the input of OR gate 36 which outputs signal ENSB.

Self sustaining of signal ENSB in output from gate 36 is obtained by connecting the output of gate 36 to an input of an AND gate 38, having a second input connected to the output of a NAND gate 37.

Signals NSBINLM and CK are input to NAND 37.

The output of AND gate 38 is connected to an input of gate 36.

It will be noted that three categories of signals are input to gates 34,35:

local bus access request signals competing among them: SBINLM,LMRQ,SBRQ. These signals are arbitrated in conventional manner. SBINLM has lower priority than LMRQ and SBRQ: in order for SBINLM to assert ENSB, LMRQ and SBRQ must be deasserted.

signals which indicate the status of the local bus as busy (MPSB,MPLM,ENRSB,ENRLM). They all must be deasserted if the local bus has to be granted to any unit.

signals which indicate the busy status of the destination resources (LMBSY,LMRPG) which must be deasserted if the local bus has to be granted for access to such destination resources.

It will be further noted that the access request (SBINLM) in addition to requesting the local bus, designates the destination unit (local memory) and is further characterized by an accompanying indicator signal (SBR/W) indicating the kind of operation to be performed, hence the resources required for its execution.

In the shown example the designation of the destination unit is implied in signal SBINLM because unit 40 may designate the local memory only.

However, as it is the case for processor MP, unit 40 may be conceived to request access to several resources by using a plurality of access request signals or a single local bus access request signal accompanied by resource designation signals.

Based on the already listed logical equations it is straight forward to design logical networks for generation of the signals ENRLM, ENRSB,ENCPU.

These networks are represented by block 39.

It may be noted that generation of signals ENRLM, ENRSB does not require the checking of the destination unit status (which will be obviously waiting for the read out data, hence available to receive it).

As to ENCPU, this signal is generated by default.

Therefore the status of the destination unit does not have to be considered. On the contrary, the status of the destination unit is a condition for effective local bus access and generation of signals MPLM and MPSB by block 12.

However nothing precludes providing central unit CPUs where the processors MP obtains access to local bus by an arbitration unit on the basis of specific bus access requests and specific bus grant answers which may be generated, not only in compliance with the established priority and the local bus availability, but also in dependence on the effective availability of the destination resource.

It is further clear that whilst reference has been made to CPU's where the "masters" are limited to the processor 7 and the input interface block with the system bus (10,40), the CPUs may comprise a greater number of "master" units such as for instance a direct memory access unit (DMA) or peripheral controllers.

The same consideration is true for the passive or "slave" units: Register banks and other resources may be contemplated in addition to local memory 8 and output interface block with the system bus (10,9).

What is claimed is:

1. A data processing system comprising: a plurality of masters and a plurality of shared resources to which said masters have access through communication means:
   an arbitration unit coupled to said masters and to said resources through said communication means; and
   first means in each one of said masters for generating and inputting to said arbitration unit, through said communication means, access request signals indicating that said masters need to direct, through said communication means, a resource selected among said resources to perform an operation, said selected resource being indicated by at least one of said access request signals;

said arbitration unit receiving said access request signals and arbitrating among competing access request signals, concurrently received from a plurality of masters, according to predetermined priority criteria, said arbitration unit including:

prevention means responsive to a previous arbitration of said arbitration unit having granted access to one of said masters, through said communication means, for directing an indicated resource to perform an operation, said prevention means serving to prevent said arbitration unit from removing access by said master to said resource, through said communication means, when an operation is currently in execution;

masking means responsive to a signal generated by at least one of said resources and received through said communication means indicating that said resource is ready to perform an operation or not;

said masking means masking access request signals indicating a resource which is not ready to perform an operation; and said arbitration unit generating an access grant signal granting access to one of said masters based on arbitration performed among unmasked competing access request signals received through said communication means.

2. A data processing system as in claim 1 wherein at least one of said resources comprises second means for generating in advance of said arbitration, said signal indicating that said at least one resource is ready to perform an operation or not.

3. A data processing system as in claim 1 wherein said first means generates and inputs to said arbitration unit, through said communication means, access request signals indicating that said masters need to direct, through said communication means, a resource selected among said resources to perform an operation selected from among a plurality of operations, said selected resource and said selected operation being indicated by at least one of said access request signals.

4. A data processing system as in claim 1 wherein said arbitration unit comprises a state machine tracing the state of at least one of said resources as ready to perform an operation or not based on a previous arbitration of said arbitration unit.

* * * * *